United States Patent
Clark et al.

(10) Patent No.: US 9,628,502 B2
(45) Date of Patent: Apr. 18, 2017

(54) ACTIVE ATTACK DETECTION SYSTEM

(71) Applicant: Meadow Hills, LLC, Coppell, TX (US)

(72) Inventors: David Clark, Coppell, TX (US); John Strand, Stugis, SD (US); Jonathan Thyer, Greensboro, NC (US)

(73) Assignee: Meadow Hills, LLC, Coppell, TX (US)

( * ) Notice: Subject to any disclaimer, the term of this patent is extended or adjusted under 35 U.S.C. 154(b) by 0 days.

(21) Appl. No.: 14/735,101

(22) Filed: Jun. 9, 2015

(65) Prior Publication Data

US 2015/0358345 A1 Dec. 10, 2015

Related U.S. Application Data

(60) Provisional application No. 62/009,534, filed on Jun. 9, 2014.

(51) Int. Cl.
| | |
|---|---|
| *H04L 29/06* | (2006.01) |
| *G06F 21/57* | (2013.01) |
| *G06F 21/55* | (2013.01) |
| *H04W 12/08* | (2009.01) |
| *H04W 12/12* | (2009.01) |

(52) U.S. Cl.
CPC ........ *H04L 63/1433* (2013.01); *G06F 21/556* (2013.01); *G06F 21/577* (2013.01); *H04L 63/1416* (2013.01); *H04W 12/08* (2013.01); *H04W 12/12* (2013.01)

(58) Field of Classification Search
None
See application file for complete search history.

(56) References Cited

U.S. PATENT DOCUMENTS

| | | |
|---|---|---|
| 6,279,113 B1 | 8/2001 | Vaidya |
| 7,346,338 B1 | 3/2008 | Calhoun et al. |
| | (Continued) | |

FOREIGN PATENT DOCUMENTS

WO 2012164336 A1 12/2012

OTHER PUBLICATIONS

Jiang, Zhiping; Zhao, Jizhong; Li, Xiang-Yang; Han, Jinsong; Xi, Wei. Rejecting the Attack: Source Authentication for Wi-Fi Management Frames using CSI Information. 2013 Proceedings IEEE INFOCOM. http://ieeexplore.ieee.org/stamp/stamp.jsp?arnumber=6567061.*

(Continued)

*Primary Examiner* — Jeremiah Avery
(74) *Attorney, Agent, or Firm* — Goodhue, Coleman & Owens, P.C.

(57) ABSTRACT

A method and system of detecting security attacks on a wireless networked computer system includes a remote sensor having a wireless adapter, processor, storage and memory, the remote sensor configured and arranged to emulate a client workstation that is activated and instructed to connect to a wireless computer network having an unknown security status. A secure communications tunnel is established via wired or wireless means between the remote sensor and a server. The server is configured to issue commands to the remote sensor and receive alert information from the remote sensor which detects security events on the wireless computer network. The server determines the threat level the security event poses to a user of the wireless computer network and issues a threat assessment to the user.

19 Claims, 5 Drawing Sheets

(56) References Cited

U.S. PATENT DOCUMENTS

| | | | |
|---|---|---|---|
| 7,409,714 | B2 | 8/2008 | Gupta et al. |
| 7,433,694 | B2 | 10/2008 | Morgan et al. |
| 7,522,908 | B2 | 4/2009 | Hrastar |
| 7,526,808 | B2 | 4/2009 | Lynn et al. |
| 7,577,424 | B2 | 8/2009 | Sinha et al. |
| 7,640,585 | B2 | 12/2009 | Lee et al. |
| 7,779,476 | B2 | 8/2010 | Lynn et al. |
| 8,060,939 | B2 | 11/2011 | Lynn et al. |
| 8,095,983 | B2 | 1/2012 | Guruswamy |
| 8,261,351 | B1 | 9/2012 | Thornewell et al. |
| 8,369,830 | B2 | 2/2013 | Sperti et al. |
| 8,544,087 | B1 | 9/2013 | Eskin et al. |
| 8,578,166 | B2 | 11/2013 | De Monseignat et al. |
| 8,595,790 | B2 | 11/2013 | Chang et al. |
| 8,646,074 | B1 | 2/2014 | Gangadharan |
| 8,650,651 | B2 | 2/2014 | Podjarny et al. |
| 8,677,497 | B2 | 3/2014 | Basavapatna et al. |
| 8,856,869 | B1* | 10/2014 | Brinskelle ............... H04L 63/08 726/12 |
| 2006/0026682 | A1* | 2/2006 | Zakas .................... H04L 29/06 726/22 |
| 2007/0022469 | A1* | 1/2007 | Cooper .................... H04K 1/00 726/3 |
| 2007/0107043 | A1* | 5/2007 | Newstadt ............. H04L 63/102 726/2 |
| 2007/0192863 | A1* | 8/2007 | Kapoor .................. G06F 9/505 726/23 |
| 2009/0307773 | A1 | 12/2009 | Kwan |
| 2011/0231510 | A1* | 9/2011 | Korsunsky ............. G06F 21/55 709/213 |
| 2012/0266209 | A1* | 10/2012 | Gooding ................ H04L 63/20 726/1 |
| 2013/0014263 | A1 | 1/2013 | Porcello et al. |

OTHER PUBLICATIONS

Sen, Jaydip. An Intrusion Detection Architecture for Clustered Wireless Ad Hoc Networks. 2010 Second International Conference on Computational Intelligence, Communication Systems and Networks (CICSyN). http://ieeexplore.ieee.org/stamp/stamp.jsp?arnumber=5615975.*

Sourour, Meharouech; Adel, Bouhoula; Tarek, Abes. Security Implications of Network Address Translation on Intrusion Detection and Prevention Systems. 2009 International Conference on Network and Service Security. N2S '09. http://ieeexplore.ieee.org/stamp/stamp.jsp?arnumber=5161675.*

Roche, Michael, "Wireless Hacking Tools", http://www.cs.wustl.edu/~jain/cse571-07/ftp/wireless_hacking/ (Accessed Jun. 18, 2014).

Ramachandran, V. et al., "Detecting ARP Spoofing: An Active Technique" In Proceedings of 1st International Conference on Information Systems Security Lecture Notes in Computer Science 2005, vol. 3803, pp. 239-250.

Kuzmanovic, A. et al., "Low-Rate TCP-Targeted Denial of Service Attacks: (The Shrew vs. the Mice and Elephants)" Proceeding of the 2003 SIGCOMM Proceedings on Applications, technologies, architectures, and protocols for computer communications, pp. 75-86.

Kline, E. et al., "Securing Data Through Avoidance Routing" NSPW '09, Sep. 8-11, 2009, Oxford, UK.

* cited by examiner

ACTIVE ATTACK DETECTION SYSTEM

CROSS-REFERENCE TO RELATED APPLICATION

This application claims priority to earlier filed U.S. Provisional Application Ser. No. 62/009,534, filed Jun. 9, 2014, the contents of which are incorporated herein by reference.

BACKGROUND OF THE INVENTION

1. Field of the Invention

The present patent document relates generally to detecting security breaches in wireless networks and more particularly to a method and system to ascertain the security of a wireless computer network system and actively detect attacks in wireless computer network systems.

2. Background of the Related Art

Traditional wireless intrusion detection/prevention (WIPS) technologies are focused almost exclusively on the radio frequency (RF) spectrum to reactively detect malicious wireless traffic. Capabilities usually include detection of "Evil Twin" access points (AP's), man in the middle, denial of service, and static known attack signatures. Responses of a traditional WIPS include de-authentication of devices, black listing, and rogue AP reporting.

In much the same way, traditional network resident intrusion detection and prevention systems are focused on matching signatures (using a rule set) of network traffic transiting a network interface and blocking or alerting to bad traffic.

All of these techniques are not usable on foreign, or unknown wireless computer networks, where the security and control of the foreign computer network system is unknown. Accordingly, there is a need in the industry for a user to be able to determine whether participation in a foreign or unknown wireless computer network is a security risk prior to joining the wireless computer network with.

SUMMARY OF THE INVENTION

The system and method solves the problems of the prior art by using a remote sensor that includes a virtual client subsystem mimicking a client workstation. By connecting to the wireless network, the remote sensor may monitor and report security threats to a server through a secure, private tunnel (via wired or wireless means), which are then reported back to the user via an application on the user's smartphone, prior to the user initiating access to the wireless network with a vulnerable workstation, such as a laptop.

As described herein, the system and method focuses on the 802.11 (or other wireless technologies) radio frequency spectrum used in wireless computer networks, but the techniques used are generally applicable to wired computer networks. The method and system further in a post authentication/association status, provides additional detection capabilities are deployed in the OSI network layer 2, and layer 3 space. The system is configured to detect many common security threats in wireless and wired computer networks, such as, ARP traffic amplification, and gratuitous ARP attacks; unusual ARP traffic behavior such as network man in the middle (MITM) traffic interception; unusual DHCP client behavior such as client ID mismatch, O/S change, name changes, IP conflict; evil twin AP spoofing; 802.11 Beacon Flooding; de-authentication and Disassociation Flooding with valid or invalid status codes; Authentication Denial of Service; MAC address filter brute-force attempts; EAPOL start/logoff packet flooding; WPA downgrading; and MIC shutdown exploitation. Other types of attacks may be detected, such as unusual ICMP transmissions, unusual IP options within packets and unsolicited unicast traffic.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Generally, the method and system includes a distributed architecture including a server and remote sensors. A user may activate and assess the threat level of a wireless network using a mobile device, such as a smartphone, to request the server perform a threat analysis. The server initiates contact with the user assigned remote sensor via a secure private tunnel through a protocol such as OpenVPN or IPSEC and queries the remote sensor for potential security threats on the wireless computer network, such as ARP traffic amplification, and gratuitous ARP attacks; unusual ARP traffic behavior such as network man in the middle (MITM) traffic interception; unusual DHCP client behavior such as client ID mismatch, O/S change, name changes, IP conflict; evil twin AP spoofing; 802.11 Beacon Flooding; de-authentication and Disassociation Flooding with valid or invalid status codes; Authentication Denial of Service; MAC address filter brute-force attempts; EAPOL start/logoff packet flooding; WPA downgrading; and MIC shutdown exploitation. To perform this analysis the remote sensor joins the computer network indicated by the user for threat analysis. The remote sensor not only passively listens for activity indicative of a security threat, but may also actively transmit typical internet traffic, thereby trying to lure an active attack against the remote sensor.

Figure 1:
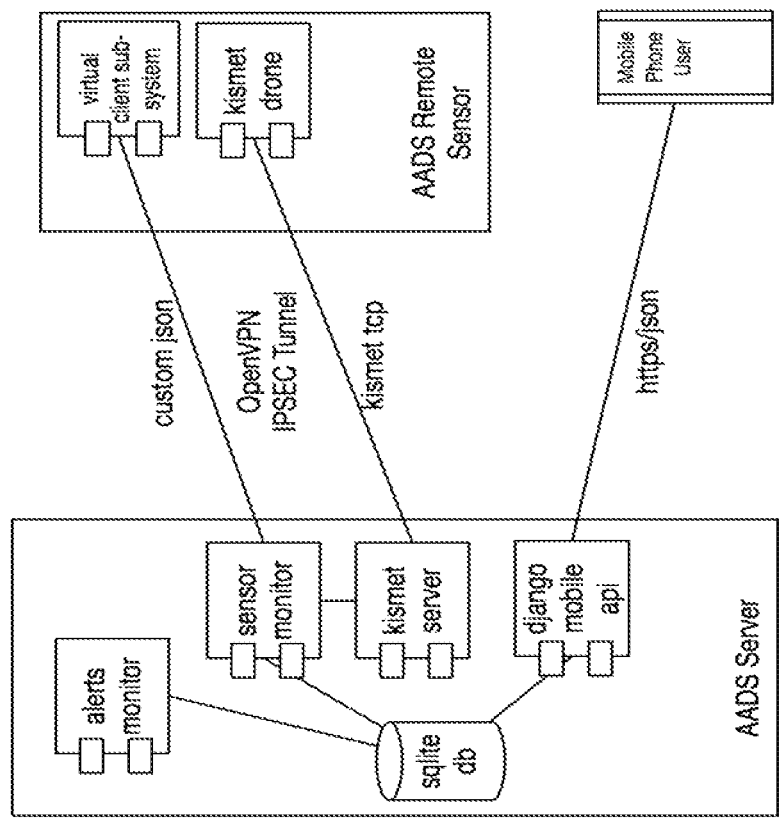
FIG. 1 is a diagram of an embodiment of the active attack detection system and method.

Referring to FIG. 1, the system includes a server, a remote sensor and a mobile device, such a smartphone, to communicate and issue commands to the server. The server includes a database with a number of tables for tabulating security events and other network and remote sensor information received from the remote sensor, multiple system processes which monitor and/or communicate with the remote sensor. The server further receives commands from the mobile device to activate and monitor the remote sensor. The server may use a relational database to track system user information, sensor information, wireless LAN information, alert, and alert summary information. Multiple remote sensors may be controlled by a single server. The server architecture includes software which implements a control channel to the remote sensors, monitors sensor alert information, and provides a mobile device application programming interface (API) for alert summary, and detailed alert information to be transmitted to the user. The mobile API is additionally used to receive an indication of user interest in performing analysis on a specific WLAN.

The server further transmits security alerts to the mobile device, informing the user whether the threat of using a device on the monitored wireless network is safe.

The database tables include a remote sensor tracking table (aads_sensor), a wireless LAN tracking table (aads_wlan), a detailed alert information table (aads_alert), an alert summary totals table (aads_alerttotals), and a wireless LAN interest table (aads_wlaninterest). The table names are of no particular significance and only provided for clarity. Supporting relational database tables such as severity, and alert classification information are also included. The aads_sensor table includes remote sensor information and a primary key from a remote sensor 'uuid' derived from the kismet drone. The aads_wlan table includes Wlan info by SSID, BSSID, and remote sensor uuid, which is further updated with live info. The wireless LAN interest table acts as a trigger system with information inserted when the user requests a specific network analysis. Information within this table is transient in nature. The aads_alert table includes all alert information capture. More specifically, all alerts captured by both the Radio Frequency (RF) KISMET monitor component, and the Virtual Client Sub-System component. The aads_alerttotals table includes totals for all alerts by severity. Then aads_wlaninterest table includes information for transient connection requests, indicating new interest in joining a WLAN under surveillance. An aads_alertclass table classifies the alerts into severities. An aads_alertseverity includes a listing of severities with an integer key.

The server includes multiple processes, which monitor and communicate with the remote sensor. Specifically, the server includes an alerts monitor process, which monitors an aads_alert table in the database for new security events. The alerts monitor further issues threat assessments to the user and writes alerts summaries to the aads_alerttotal table in the database and creates XML formatted logs of alert summaries, which may be viewed by the user or reviewed later by security specialists. The server includes a sensor monitor which communicates through the secure tunnel with a virtual client subsystem on the remote sensor, described further below, using a proprietary javascript object notation (JSON) command interface, which includes custom commands to instruct the remote sensor to associate with an SSID, make DHCP client requests, make DNS lookup request, and the like. The server and remote sensor include a combined network detector, packet sniffer and intrusion detection system, such as a Kismet (or similar) server and Kismet (or similar) drone, described further below. The server further includes an API interface for receiving commands from a user through secure JSON command interface.

The remote sensor includes a virtual client subsystem that mimics a real workstation client on the network being analyzed. The virtual client subsystem defaults to mimicking a Microsoft Windows computer by sending out communications requests, such as NetBIOS, SSDP, DHCP traffic, HTTP transactions and the like. The virtual client subsystem may be configured to emulate other Operating Systems, or other platforms, such as Apple iOS based devices and Google Android based devices. The remote sensor also includes a Kismet drone as well. Both the virtual client subsystem and kismet drone communicate back to the server through the secure private tunnel.

Figure 2A:
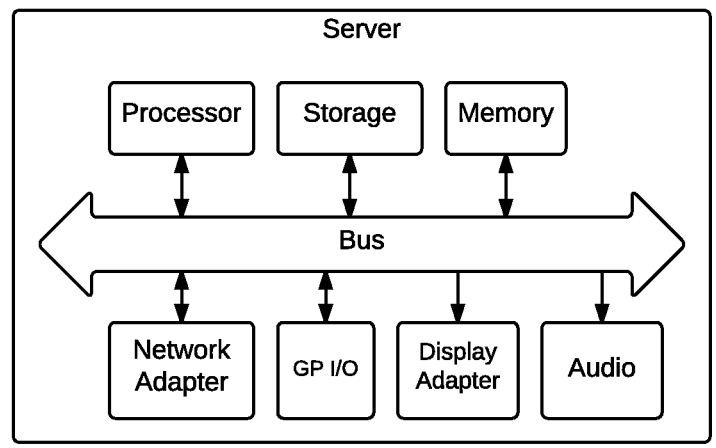
FIG. 2A is a diagram of an embodiment of a server that may be used in the active attack detection system and method.
Figure 2B:
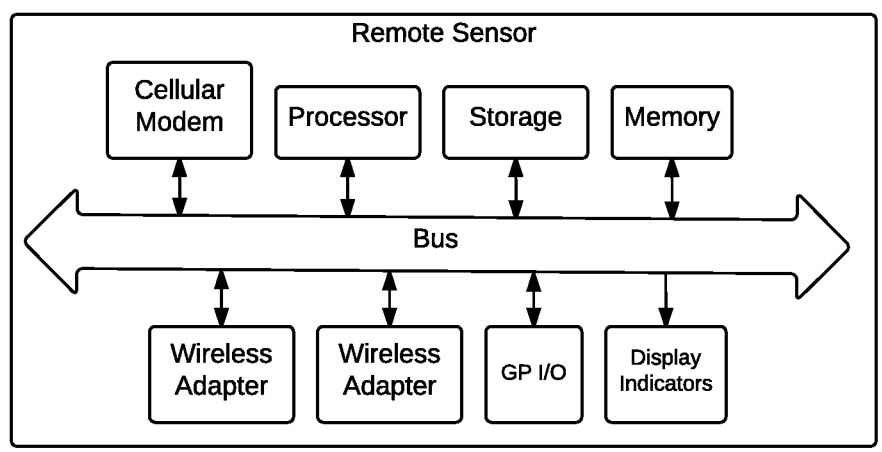
FIG. 2B is a diagram of an embodiment of a remote sensor that may be used in the active attack detection system and method.

Referring to FIG. 2A the server may be a general purpose computer server, having a processor, storage, memory, a network adapter, general purpose input/output controller and display controller and the like. Similarly, referring to FIG. 2B, the remote sensor includes a processor, memory, storage, two wireless adapters, a cellular modem, general purpose input/output ports, video and audio output ports all interconnected via a system bus. The remote sensor is essentially a miniature computer or system on a chip. The remote sensor may be a custom built system or use off-the-shelf products, such as a Raspberry Pi, Beagle Bone Black, or Arduino microcomputer, by way of example and not limitation.

Figure 3:
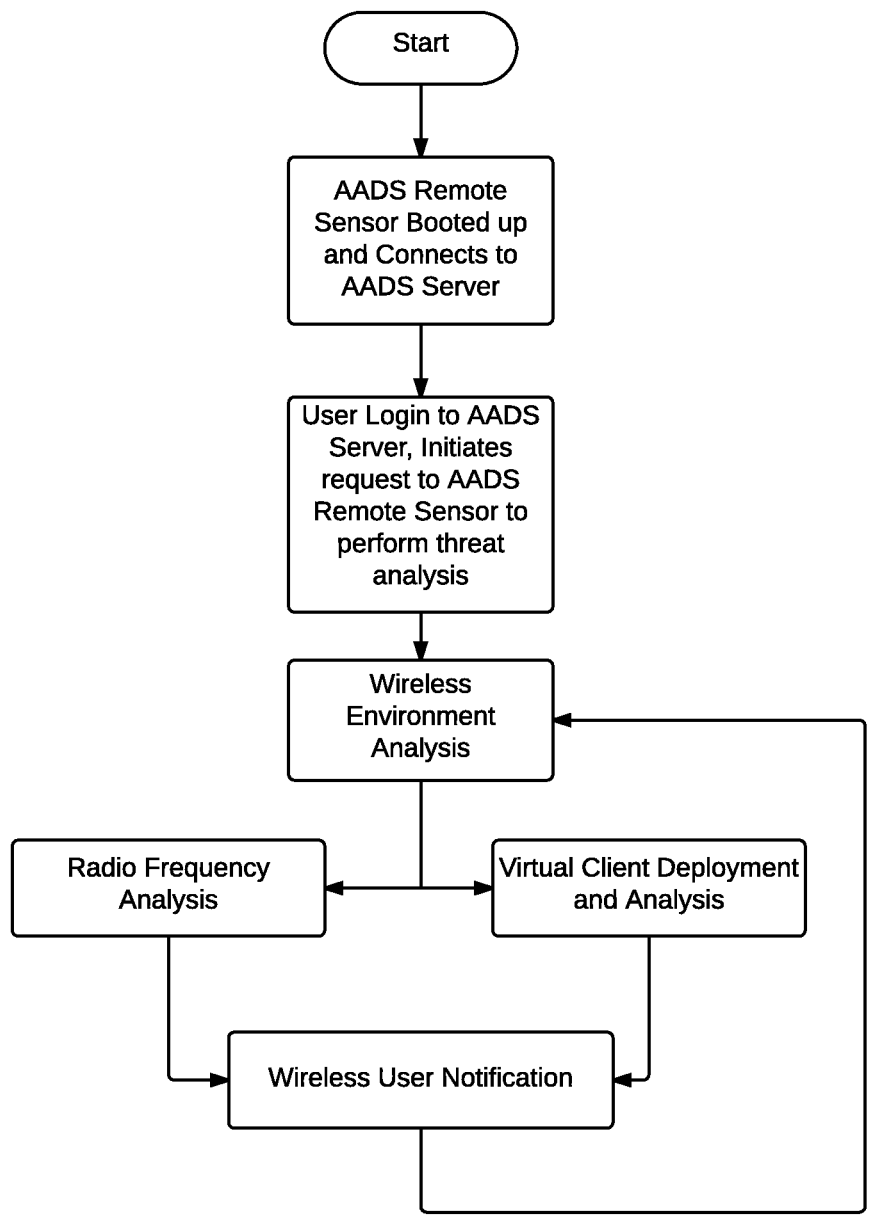
FIG. 3 is a flowchart of an overview of a method of detecting attacks and analyzing threats on a wireless computer network.

Referring to FIG. 3, in general, the system and method of the active attack detection system works generally, by activating the remote sensor in an environment where the wireless network desired to be tested is located. The remote sensor boots up and connects to the server, establishing a secure, private tunnel. The communications between the remote sensor and the central server may be through the OpenVPN tunnel which may be carried over a cellular modem back channel. The remote sensor may use the cellular network as an out of band command channel for OpenVPN. Using a mobile device, the user logins into the server using the cellular data and requests and initiates a request to perform a threat analysis of the local wireless network. The server issues the commands to the remote sensor to perform a wireless environment analysis comprising a radio frequency analysis and deployment of the virtual client subsystem to initiate contact with the wireless network. The remote sensor collects the security alerts discovered and reports them to the user. Security alerts are reported in a summary count by severity, as well as detailed alert information if requested.

The remote sensor may operate in other modes to perform other security validation tests as well. In addition to operating the virtual client subsystem, the remote sensor may operate in a listening mode only, a honeypot emulation mode with combined listening. Listening mode includes both spectrum and channel hopping to listen to the local environment for network attacks. In the 802.11g 2.4 Ghz spectrum, channel hopping will occur through all eleven channels, at a minimum, with extended time spend on non-overlapping channels 1, 6, and 11. A similar method will be extended to the 5 Ghz spectrum. MIMO based modes (802.11n), carrier aggregation, and WiFi using Link Aggregation with cellular technologies will additionally be accommodated. Several minutes of listening may be required before moving between modes of processing. In honeypot emulation and listen mode, one radio will be moved into an 802.11g station mode. Wireless association on a single channel will occur for all listed client machine types to be emulated in turn. The listening radio will fixate on the same channel and continue to detect attacks.

Users on laptop systems waiting to use a wireless network may be notified through their mobile device through email, SMS text, and/or smartphone application as to whether a specific geographic area is safe for network use. In the case of a smartphone application, the ability to login to the system, and select/display detailed information about wireless networks in the geographic vicinity will be included.

The notifications may include a threat level, such as high, med, low and info, and messages describing the nature of the threat, such as ARP/IP mapping change, IP option received, ICMP unassigned code, ICMP suspicious code, TCP SYN/Ack short RTT, DNS query hash mismatch, HTTP transaction hash mismatch, geolocation information, and geolocation enabled routing hop trace information. The user then may determine whether the security risk warrants use of the wireless network with a more vulnerable device, such as a laptop. These security threat levels are fully customizable.

Figure 4:
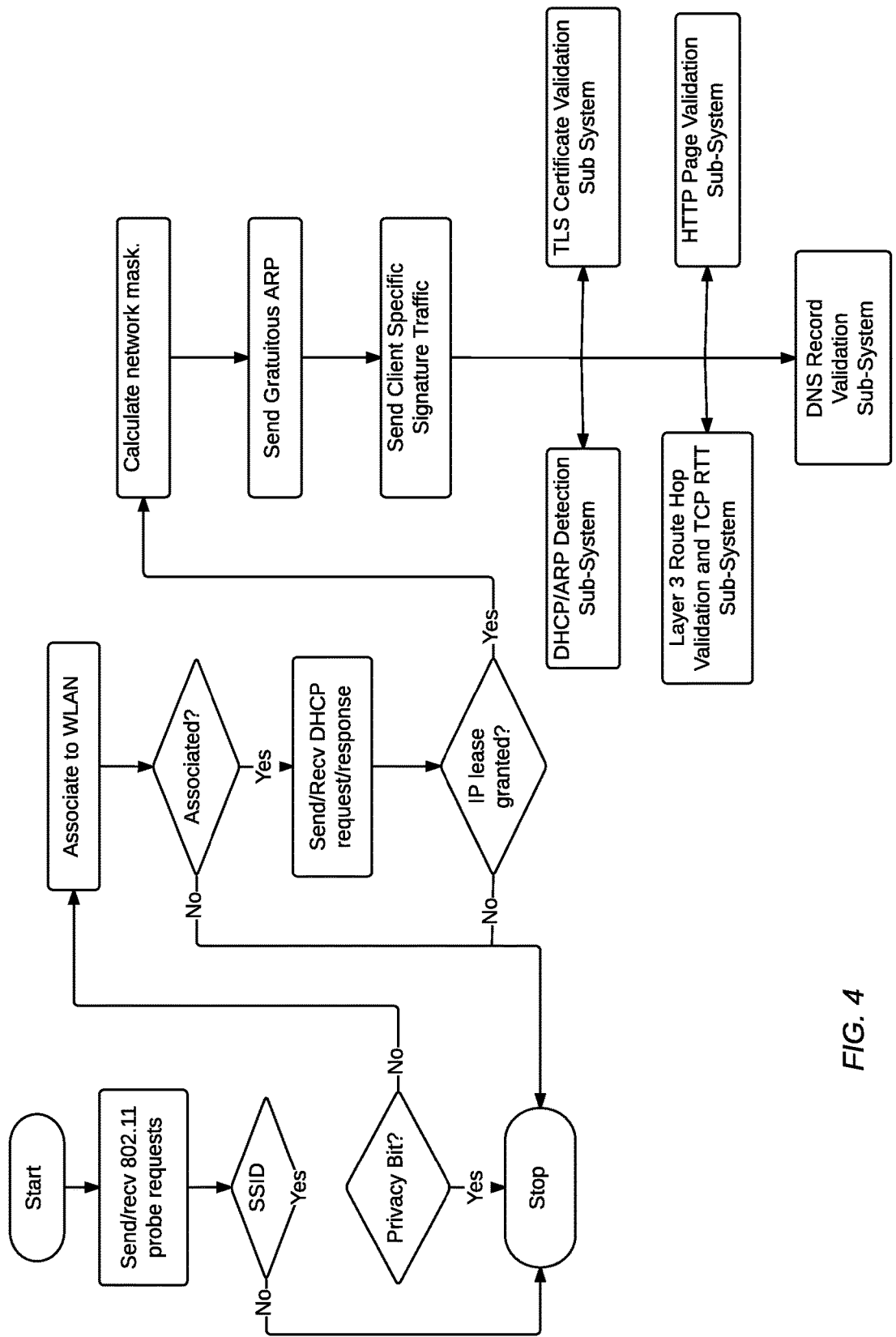
FIG. 4 is a flowchart of a method of detecting common security threats in a wireless computer network.

Referring to FIG. 4, using the virtual client subsystem and Kismet drone, the remote sensor tracks OSI layer 2 and layer 3 address assignment information on a per-BSSID basis. The secondary goal of this subsystem is to determine whether a rogue DHCP server, or other OSI layer 2 ARP table manipulation is being introduced into a WLAN environment. Several different metrics such as overall DHCP options, DHCP server lease times, router address, and DNS server address will be used to form a signature of a legitimate versus rogue DHCP server. Signatures may be stored, shared, and cross-referenced. In addition to this, the ARP monitoring monitors the default router MAC address mapping, continuously checking that the address is not being re-mapped to an intruder controlled service.

The monitoring of DHCP and ARP may operate in two modes. The base-lining mode will be used to ascertain legitimate resources, and will take statistical samples of both DHCP lease information, and ARP data over a period of time to make a best determination of what data is considered genuine. Once a baseline is established, the data will be written to a central database and subsequently retrievable for future assessment. The environment assessment mode will receive DHCP OFFER/ACK packets, and ARP replies, and compare this data with historical information in the database. If there is an unexpected variance, the system will warn the user of unsafe operating conditions.

The virtual client subsystem may also collect other information such as geolocation, geographic TCP based route hop tracing, proxy detection, DNS transaction hashing, HTTP transaction hashing, and social media information.

Figure 5:
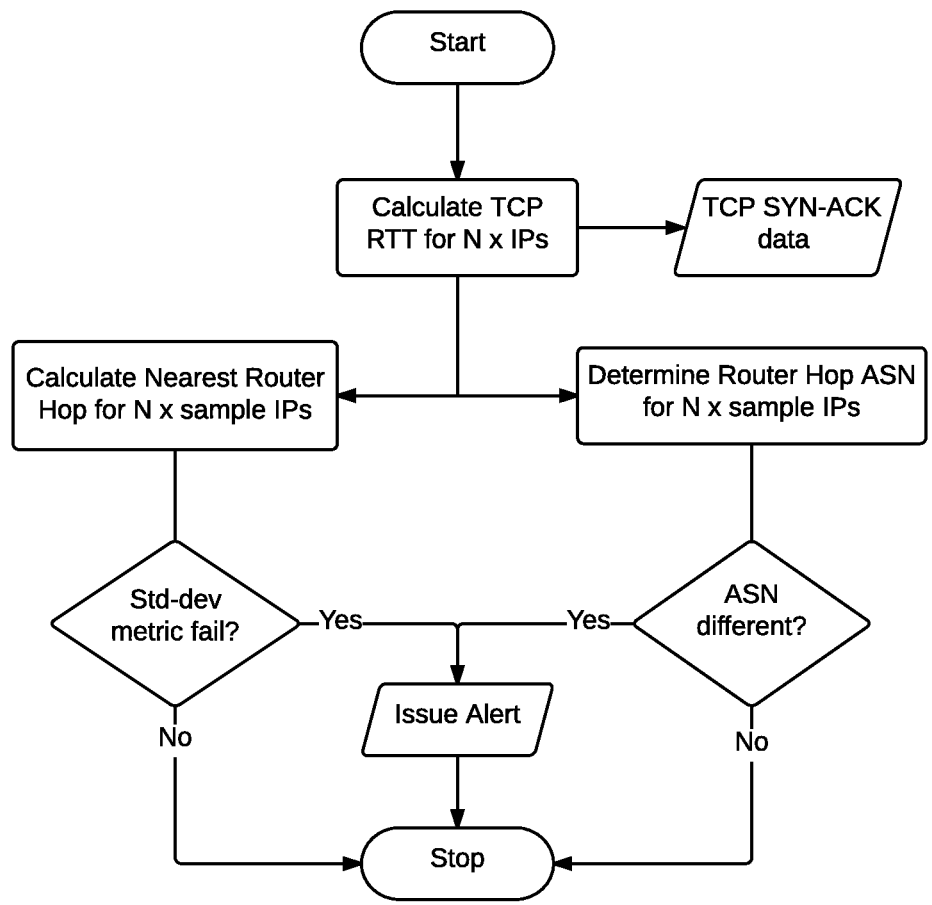
FIG. 5 is a flowchart of a method of calculating and verifying the number of route hops in a wireless computer network.

Referring to FIG. 5, the virtual client subsystem may also analyze the number of router hops that an Internet resource is away from its location. In addition, the virtual client will measure the TCP round-trip time (RTT) by measuring the different in time between a TCP SYN, and TCP SYN-ACK packet for an Internet address.

The route hop calculation will occur by sending a TCP SYN packet to an Internet address and looking at the IP TTL of the TCP SYN-ACK packet returned. Almost all Internet servers are going to initiate traffic with an IP TTL of either 64, 128, or 255. The returned TCP SYN-ACK packet will have a TTL lower than one of these figures by a value of the number of router hops between the source and destination. For an example, let's say the returned packet has an IP TTL of 248. The virtual client subsystem will then attempt to confirm the router hop value by re-sending the TCP SYN packet with initial TTL of 255−248=7 in order to elicit an ICMP time exceeded response from the nearest upstream router to the destination resource.

The virtual client subsystem will repeat both the router hop, and TCP RTT time calculation for up to N×Internet Addresses where 0<N<10. If the standard deviation across the sample changes by more than (X—to be determined), then a warning will be issued for potential man in the middle (MITM) traffic interception.

In addition, the nearest upstream router will have its Autonomous System Number (ASN) determined through a DNS query to the Cymru ASN mapping service (dig+short 1.2.3.4.origin.asn.cymru.com TXT). Deviations in the upstream router ASN over successive samples will also result in a warning.

The virtual client subsystem will have a pre-configured list of domain names for which a forward DNS resolution will be executed. If the resulting DNS record returned does not match expected results this test will be considered as a failure. The list of known domain name results will include all of the ROOT name servers "a.root-servers.net", "b.root-servers.net", . . . as well as some very popular services on the Internet such as www.google.com, selected financial sites, and any other customer specified sites of interest.

The virtual client sub-system may also perform an HTTP GET across a programmed selection or URL's and compare a hash of the result with known information. Exact matches will be score as one, while non-matches will be scored as zero. At least 30 samples will be taken and a statistical matching metric calculated. If above a pre-defined threshold, this test will be considered a success otherwise a failure.

The virtual client subsystem may also perform a SSL/TLS certificate verification for a defined list of known SSL encrypted websites. In addition to fetching and verifying the certificate, the virtual client subsystem will be able to use Internet port scan data (scans.io) to perform a binary comparison of the certificate retrieved.

Therefore, it can be seen that the present invention provides a unique solution to the problem of assessing the security status of a wireless computer network prior to joining or using the network with a potentially vulnerable device, such as a laptop. Because the remote sensor, using a virtual client subsystem that mimics a client workstation on the network, is the only device connected to the network prior to the threat assessment, potential attacks are the user's data and system security can be mitigated.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method of detecting security attacks on a networked computer system, comprising:
    activating a remote sensor, the remote sensor having a wireless or wired adapter, cellular modem, processor, storage and memory, the remote sensor configured and arranged to emulate a client workstation;
    connecting the remote sensor to a computer network, the computer network having an unknown security status;
    establishing a secure communications tunnel between the remote sensor and a server, the server configured and arranged to issue commands to the remote sensor and receive alert information from the remote sensor;
    detecting a security event with the remote sensor comprises capturing internet protocol events by:
        comparing one or more patterns from one or more other attackers;
        comparing one or more detected behaviors from one or more other active attack detection systems;
    with the server, determining a threat level the security event poses to a user of the computer network; and
    issuing a threat assessment from the server to the user before the user accesses the computer network.

2. The method of claim 1, further comprising creating a database on the server, the database having a plurality of tables configured and arranged to tabulate security events.

3. The method of claim 2, further comprising calculating a total of security events by type.

4. The method of claim 2, further comprising classifying a security event by severity.

5. The method of claim 2, further comprising creating and storing signatures for comparison, sharing, and cross-referencing.

6. The method of claim 1, wherein the step of detecting a security event comprises capturing open systems interconnection layer 2 events.

7. The method of claim 1, wherein the step of detecting a security event comprises capturing open systems interconnection layer 3 events.

8. The method of claim 1, wherein the step of detecting a security event comprises capturing address resolution protocol events.

9. A system of detecting security attacks on a networked computer system, comprising:
   a remote sensor having a wired or wireless adapter, processor, storage and memory, the remote sensor configured and arranged to emulate a client workstation connected to a computer network through the wired or wireless adapter;
   a server having a processor, storage, memory, and network adapter, the server configured and arranged to selectively connect to the remote sensor through a secure tunnel established between the network adapter and a remote sensor cellular modem;
   the remote sensor further configured and arranged to detect and report security threats to the server, wherein detection of security threats comprises capturing internet protocol events by:
      comparing one or more patterns from one or more other attackers;
      comparing one or more detected behaviors from one or more other active attack detection systems; and
   the server further configured and arranged to create a threat assessment of the security threats received from the remote sensor and report the threat assessment to a user before the user accesses the computer network.

10. The system of claim 9, further comprising a virtual client subsystem on the remote sensor and a sensor monitor module on the server communicating through the secure tunnel, the virtual client subsystem configured and arranged to emulate the client workstation within an environment of the computer network.

11. The system of claim 9, further comprising a combined network detector, packet sniffer and active attack contextual analysis system having the remote sensor and a central server module connected through the secure tunnel.

12. The system of claim 9, further comprising a database on the server, the database containing a plurality of tables configured and arranged to store and retrieve security threat information received from the remote sensor.

13. The system of claim 12, further comprising an alerts monitor module configured and arranged to read the database and create a log of alert summaries received form the remote sensor.

14. The system of claim 13, wherein the log of alert summaries is in XML format.

15. The system of claim 9, wherein the remote sensor captures open systems interconnection layer 2 events.

16. The system of claim 9, wherein the remote sensor captures open systems interconnection layer 3 events.

17. The system of claim 9, wherein the remote sensor captures address resolution protocol events.

18. The system of claim 9, wherein the remote sensor captures address resolution protocol/internet protocol mapping changes.

19. The system of claim 9, wherein the remote sensor captures internet control message protocol events.

* * * * *